(12) United States Patent
Li et al.

(10) Patent No.: US 8,372,917 B2
(45) Date of Patent: Feb. 12, 2013

(54) POLYMERIC BLENDS AND METHODS OF USING SAME

(75) Inventors: Fengkui Li, Houston, TX (US); Tim J. Coffy, Houston, TX (US); Michel Daumerie, Houston, TX (US)

(73) Assignee: Fina Technology Inc, Houston, TX (US)

( * ) Notice: Subject to any disclaimer, the term of this patent is extended or adjusted under 35 U.S.C. 154(b) by 0 days.

(21) Appl. No.: 13/562,096

(22) Filed: Jul. 30, 2012

(65) Prior Publication Data
US 2012/0296044 A1 Nov. 22, 2012

Related U.S. Application Data

(62) Division of application No. 12/165,037, filed on Jun. 30, 2008, now Pat. No. 8,268,913.

(51) Int. Cl.
*C08F 242/00* (2006.01)

(52) U.S. Cl. .......... 525/190; 428/98; 428/339; 523/514; 523/515; 523/527; 525/410; 525/415; 525/450; 528/361

(58) Field of Classification Search ............... 428/98, 428/339; 523/514, 515, 527; 525/190, 410, 525/415, 450; 528/361
See application file for complete search history.

(56) References Cited

U.S. PATENT DOCUMENTS

2007/0123650 A1 * 5/2007 Aguirre et al. .................. 525/88
2010/0009208 A1 * 1/2010 Lee ............................... 428/483

FOREIGN PATENT DOCUMENTS

JP 2005-307128 * 11/2005

* cited by examiner

*Primary Examiner* — Robert Jones, Jr.

(57) ABSTRACT

A film comprising a polylactic acid and polypropylene blend having a haze of from about 10% to about 95% and a gloss 45° of from about 50 to about 125. A method of producing an oriented film comprising blending polypropylene and polylactic acid to form a polymeric blend, forming the polymeric blend into a film, and orienting the film. A method of producing an injection molded article comprising blending polypropylene and polylactic acid to form a polymeric blend, injecting the polymeric blend into a mold, and forming the article.

19 Claims, 12 Drawing Sheets

POLYMERIC BLENDS AND METHODS OF USING SAME

CROSS-REFERENCE TO RELATED APPLICATIONS

This application is a divisional of U.S. application Ser. No. 12/165,037, filed on Jun. 30, 2008. The subject matter of the present application is related to U.S. patent application Ser. No. 12/165,051, filed on Jun. 30, 2008, entitled "Compatibilized Polypropylene and Polylactic Acid Blends and Methods of Making and Using Same" and U.S. patent application Ser. No. 12/165,059, filed on Jun. 30, 2008, entitled "Polymeric Compositions Comprising Polylactic Acid and Methods of Making and Using Same," and are hereby incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable

BACKGROUND

1. Technical Field

This disclosure relates to polymeric compositions. More specifically, this disclosure relates to polymeric compositions comprising a biodegradable polymer.

2. Background

Synthetic polymeric materials, particularly polypropylene resins, are widely used in the manufacturing of a variety of end-use articles ranging from medical devices to food containers. Many industries, such as the packaging industry, utilize these polypropylene materials in various manufacturing processes to create a variety of finished goods including biaxially oriented polypropylene (BOPP) films.

While articles constructed from synthetic polymeric materials have widespread utility, one drawback to their use is that these materials tend to remain semipermanently in a natural environment. In response to environmental concerns, interest in the production and utility of more readily biodegradable polymeric materials has been increasing. These materials, also known as "green materials" or may undergo accelerated degradation in a natural environment. The utility of these biodegradable polymeric materials is often limited by their poor mechanical and/or physical properties. Thus, a need exists for biodegradable polymeric compositions having desirable physical and/or mechanical properties.

SUMMARY

Disclosed herein is a film comprising a polylactic acid and polypropylene blend having a haze of from about 10% to about 95% and a gloss 45° of from about 50 to about 125.

Also disclosed herein is a method of producing an oriented film comprising blending polypropylene and polylactic acid to form a polymeric blend, forming the polymeric blend into a film, and orienting the film.

Further disclosed herein is a method of producing an injection molded article comprising blending polypropylene and polylactic acid to form a polymeric blend, injecting the polymeric blend into a mold, and forming the article.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
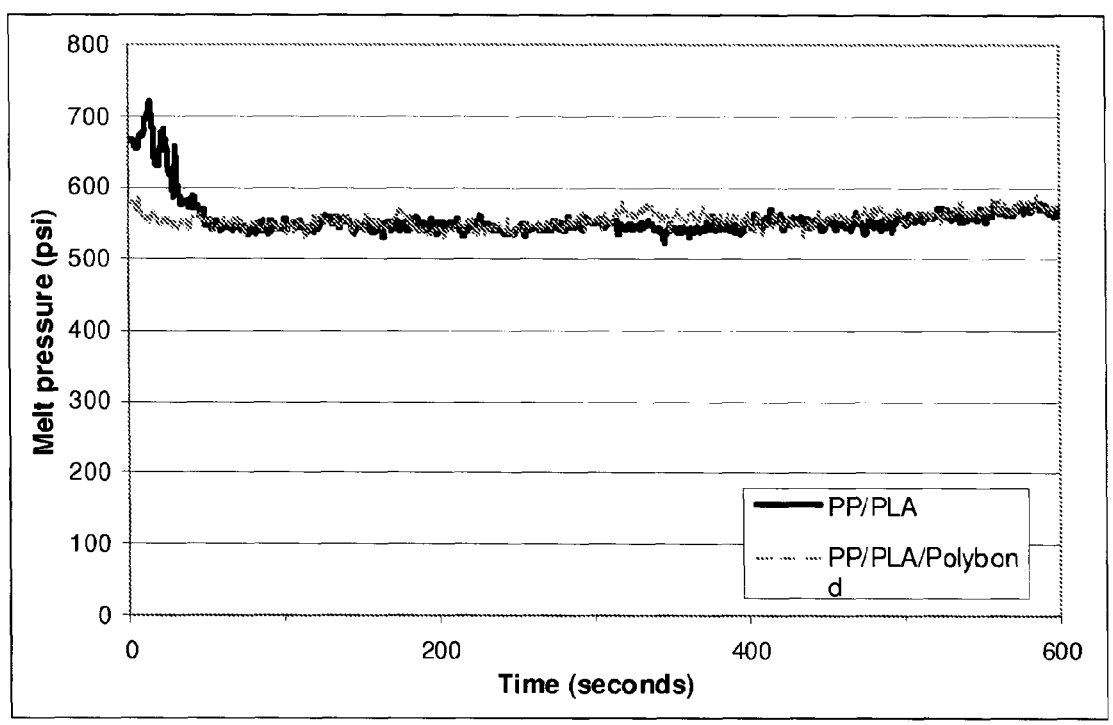
FIG. 1 is a plot of melt pressure during extrusion for the samples from Example 1.

Disclosed herein are biodegradable polymeric compositions and methods of making and using same. Herein biodegradable polymeric compositions comprises materials that are capable of being broken down especially into innocuous products by the action of living things In an embodiment, the biodegradable polymeric compositions comprise polylactic acid, alternatively polypropylene and polylactic acid. Hereinafter, this disclosure will focus on a composition comprising polypropylene and polylactic acid which will be referred to as a PP/PLA blend.

The PP/PLA blend may display desirable characteristics such as an increased strength and/or improved optical properties when compared to either polypropylene or polylactic acid alone. Hereinafter, property comparisons (e.g. mechanical, physical, optical) are being made in comparison to a polymeric composition comprising an otherwise similar polypropylene composition lacking polylactic acid or an otherwise similar polylactic acid composition lacking polypropylene.

In an embodiment, the PP/PLA blend comprises polypropylene. The polypropylene may be a homopolymer provided however that the homopolymer may contain up to 5% of another alpha-olefin, including but not limited to $C_2$-$C_8$ alpha-olefins such as ethylene and 1-butene. Despite the potential presence of small amounts of other alpha-olefins, the polypropylene is generally referred to as a polypropylene homopolymer. In alternative embodiments, the polypropylene may comprise a high crystallinity polypropylene, a polypropylene heterophasic copolymer, or combinations thereof.

Polypropylene homopolymers suitable for use in this disclosure may include any type of polypropylene known in the art with the aid of this disclosure. For example, the polypropylene homopolymer may be atactic polypropylene, isotactic polypropylene, hemi-isotactic, syndiotactic polypropylene, or combinations thereof. A polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain. In hemi-isotactic polymer, every other repeat unit has a random substituent.

In an embodiment, a polypropylene suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melting temperature of from 150° C. to 170° C., alternatively from 155° C. to 168° C., and alternatively from 160° C. to 165° C. as determined by differential scanning calorimetry; a melt flow rate of from 0.5 g/10 min. to 30 g/10 min., alternatively from 1.0 g/10 min. to 15 g/10 min., and alternatively from 1.5 g/10 min. to 5.0 g/10 min. as determined in accordance with ASTM D1238 condition "L"; a tensile modulus of from 200,000 psi to 350,000 psi; alternatively from 220,000 psi to 320,000 psi, and alternatively from 250,000 psi to 320,000 psi as determined in accordance with ASTM D638; a tensile stress at yield of from 3,000 psi to 6,000 psi, alternatively from 3,500 psi to 5,500 psi, and alternatively from 4,000 psi to 5,500 psi as determined in accordance with ASTM D638; a tensile strain at yield of from 5% to 30%, alternatively from 5% to 20%, and alternatively from 5% to 15% as determined in accordance with ASTM D638; a flexural modulus of from 120,000 psi to 330,000 psi, alternatively from 190,000 psi to 310,000 psi, and alternatively of from 220,000 psi to 300,000 psi as determined in accordance with ASTM D790; a Gardner impact of from 3 in-lb to 50 in-lb, alternatively from 5 in-lb to 30 in-lb, and alternatively from 9 in-lb to 25 in-lb as determined in accordance with ASTM D2463; a Notched Izod Impact Strength of from 0.2 ft lb/in to 20 ft lb/in, alternatively from 0.5 ft lb/in to 15 ft lb/in, and alternatively from 0.5 ft lb/in to 10 ft lb/in as determined in accordance with ASTM D256A; a hardness shore D of from 30 to 90, alternatively from 50 to 85, and alternatively from 60 to 80 as determined in accordance with ASTM D2240; and a heat distortion temperature of from 50° C. to 125° C., alternatively from 80° C. to 115° C., and alternatively from 90° C. to 110° C. as determined in accordance with ASTM D648.

Examples of polypropylene homopolymers suitable for use in this disclosure include without limitation 3371, 3271, 3270, and 3276, which are polypropylene homopolymers commercially available from Total Petrochemicals USA, Inc. In an embodiment, the polypropylene homopolymer (e.g., 3371) has generally the physical properties set forth in Table 1.

TABLE 1

| Properties | 3371 Typical Value | Test Method |
|---|---|---|
| Physical | | |
| Density, g/cc | 0.905 | ASTM D1505 |
| Melt Flow Rate (MFR), g/10 min. | 2.8 | ASTM D1238 condition "L" |
| Mechanical | | |
| Tensile Modulus, psi | 235,000 | ASTM D638 |
| Tensile Stress at Yield, psi | 5,100 | ASTM D638 |

TABLE 1-continued

| Properties | 3371 Typical Value | Test Method |
|---|---|---|
| Tensile Strain at Yield, % | 7.5 | ASTM D638 |
| Flexural Modulus, psi | 202,000 | ASTM D790 |
| Impact | | |
| Gardner impact, in-lb | 149.2 | ASTM D2463 |
| Notched Izod Impact Strength, ft lb/in | 0.69 | ASTM D256A |
| Hardness | | |
| Hardness Shore D | 75 | ASTM D2240 |
| Thermal | | |
| Heat distortion temperature, ° F. | 207 | ASTM D648 |
| Melting Temperature (DSC), ° F. | 325 | DSC |

In another embodiment, the polypropylene may be a high crystallinity polypropylene homopolymer (HCPP). The HCPP may contain primarily isotactic polypropylene. The isotacticity in polymers may be measured via $^{13}C$ NMR spectroscopy using meso pentads and can be expressed as percentage of meso pentads (% mmmm). As used herein, the term "meso pentads" refers to successive methyl groups located on the same side of the polymer chain. In an embodiment, the HCPP has a meso pentads percentage of greater than 97%, or greater than 98%, or greater than 99%. The HCPP may comprise some amount of atactic or amorphous polymer. The atactic portion of the polymer is soluble in xylene, and is thus termed the xylene soluble fraction (XS %). In determining XS %, the polymer is dissolved in boiling xylene and then the solution cooled to 0° C. that results in the precipitation of the isotactic or crystalline portion of the polymer. The XS % is that portion of the original amount that remained soluble in the cold xylene. Consequently, the XS % in the polymer is indicative of the extent of crystalline polymer formed. The total amount of polymer (100%) is the sum of the xylene soluble fraction and the xylene insoluble fraction, as determined in accordance with ASTM D5492-98. In an embodiment, the HCPP has a xylene soluble fraction of less than 1.5%, or less than 1.0%, or less than 0.5%.

In an embodiment, an HCPP suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melt flow rate of from 0.5 g/10 min. to 30 g/10 min., alternatively from 1.0 g/10 min. to 15 g/10 min., and alternatively from 1.5 g/10 min. to 5.0 g/10 min. as determined in accordance with ASTM D1238; a secant modulus in the machine direction (MD) of from 350,000 psi to 420,000 psi; alternatively from 380,000 psi to 420,000 psi, and alternatively from 400,000 psi to 420,000 psi as determined in accordance with ASTM D882; a secant modulus in the transverse direction (TD) of from 400,000 psi to 700,000 psi, alternatively from 500,000 psi to 700,000 psi, and alternatively from 600,000 psi to 700,000 psi as determined in accordance with ASTM D882; a tensile strength at break in the MD of from 19,000 psi to 28,000 psi, alternatively from 22,000 psi to 28,000 psi, and alternatively from 25,000 psi to 28,000 psi as determined in accordance with ASTM D882; a tensile strength at break in the TD of from 20,000 psi to 40,000 psi, alternatively from 30,000 psi to 40,000 psi, and alternatively of from 35,000 psi to 40,000 psi as determined in accordance with ASTM D882; an elongation at break in the MD from 50% to 200%, alternatively from 100% to 180%, and alternatively from 120% to 150% as determined in accordance with ASTM D882; an elongation at break in the TD of from 50% to 150%, alternatively from 60% to 100%, and alternatively from 80% to 100% as determined in accordance with ASTM D882; a melting temperature of from 150° C. to 170° C., alternatively from 155° C. to 170° C., and alternatively from 160° C. to 170° C. as determined by differential scanning calorimetry; a gloss at 45° of from 70 to 95, alternatively from 75 to 90, and alternatively from 80 to 90 as determined in accordance with ASTM D2457; a percentage haze of from 0.5% to 2.0%, alternatively from 0.5% to 1.5%, and alternatively from 0.5% to 1.0% as determined in accordance with ASTM D1003; and a water vapor transmission rate of from 0.15 to 0.30 g-mil/100 in$^2$/day, alternatively from 0.15 to 0.25 g-mil/100 in$^2$/day, and alternatively from 0.20 to 0.21 g-mil/100 in$^2$/day as determined in accordance with ASTM F1249-90.

An example of an HCPP suitable for use in this disclosure includes without limitation 3270, which is an HCPP commercially available from Total Petrochemicals USA, Inc. The HCPP (e.g., 3270) may generally have the physical properties set forth in Table 2.

TABLE 2

| Properties | 3270 Typical Value | Test Method |
|---|---|---|
| Physical | | |
| Density, g/cc | 0.910 | ASTM D1505 |
| Melt Mass-Flow Rate (MFR) (230° C./2.16 kg), g/10 min. | 2.0 | ASTM D1238 |
| BOPP Mechanical | | |
| Secant Modulus MD, psi | 420,000 | ASTM 882 |
| Secant Modulus TD, psi | 700,000 | ASTM 882 |
| Tensile Strength at Break MD, psi | 28,000 | ASTM 882 |
| Tensile Strength at Break TD, psi | 39,000 | ASTM 882 |
| Elongation at Break MD, % | 150 | ASTM 882 |
| Elongation at Break TD, % | 60 | ASTM 882 |
| Thermal | | |
| Melting Temperature, ° F. | 329 | DSC |
| Optical | | |
| Gloss (45°) | 85 | ASTM D2457 |
| Haze, % | 1.0 | ASTM D1003 |
| Barrier | | |
| Water Vapor Transmission, 100° F., 90% R.H, g-mil/100 in$^2$/day | 0.2 | ASTM F1249-90 |

In another embodiment, the polypropylene may be a polypropylene heterophasic copolymer (PPHC) wherein a polypropylene homopolymer phase or component is joined to a copolymer phase or component. The PPHC may comprise from greater than 6.5% to less than 11.5% by weight ethylene, alternatively from 8.5% to less than 10.5%, alternatively from 9.5% ethylene based on the total weight of the PPHC. Herein, percentages of a component refer to the percent by weight of that component in the total composition unless otherwise noted.

The copolymer phase of a PPHC may be a random copolymer of propylene and ethylene, also referred to as an ethylene/propylene rubber (EPR). PP impact copolymers show distinct homopolymer phases that are interrupted by short sequences or blocks having a random arrangement of ethylene and propylene. In comparison to random copolymers, the block segments comprising the EPR may have certain polymeric characteristics (e.g., intrinsic viscosity) that differ from that of the copolymer as a whole. Without wishing to be limited by theory, the EPR portion of the PPHC has rubbery characteristics which, when incorporated within the matrix of the homopolymer component, may function to provide increased impact strength to the PPHC. In an embodiment, the EPR portion of the PPHC comprises greater than 14 wt. % of the PPHC, alternatively greater than 18 wt. % of the PPHC, alternatively from 14 wt. % to 18 wt. % of the PPHC.

The amount of ethylene present in the EPR portion of the PPHC may be from 38 wt. % to 50 wt. %, alternatively from 40 wt. % to 45 wt,% based on the total weight of the EPR portion. The amount of ethylene present in the EPR portion of the PPHC may be determined spectrophotometrically using a Fourier transform infrared spectroscopy (FTIR) method. Specifically, the FTIR spectrum of a polymeric sample is recorded for a series of samples having a known EPR ethylene content. The ratio of transmittance at 720 cm$^{-1}$/900 cm$^{-1}$ is calculated for each ethylene concentration and a calibration curve may then be constructed. Linear regression analysis on the calibration curve can then be carried out to derive an equation that is then used to determine the EPR ethylene content for a sample material.

The EPR portion of the PPHC may exhibit an intrinsic viscosity different from that of the propylene homopolymer component. Herein intrinsic viscosity refers to the capability of a polymer in solution to increase the viscosity of said solution. Viscosity is defined herein as the resistance to flow due to internal friction. In an embodiment, the intrinsic viscosity of the EPR portion of the PPHC may be greater than 2.0 dl/g, alternatively from 2.0 dl/g to 3.0 dl/g, alternatively from 2.4 dl/g to 3.0 dl/g, alternatively from 2.4 dl/g to 2.7 dl/g, alternatively from 2.6 dl/g to 2.8 dl/g. The intrinsic viscosity of the EPR portion of the PPHC is determined in accordance with ASTM D5225.

In an embodiment, the PPHC may have a melt flow rate (MFR) of from 65 g/10 min. to 130 g/10 min., alternatively from 70 g/10 min. to 120 g/10 min., alternatively from 70 g/10 min. to 100 g/10 min., alternatively from 70 g/10 min. to 90 g/10 min., alternatively from 75 g/10 min. to 85 g/10 min., alternatively 90 g/10 min. Excellent flow properties as indicated by a high MFR allow for high throughput manufacturing of molded polymeric components. In an embodiment, the PPHC is a reactor grade resin without modification, which may also be termed a low order PP. In some embodiments, the PPHC is a controlled rheology grade resin, wherein the melt flow rate has been adjusted by various techniques such as visbreaking. For example, MFR may be increased by visbreaking as described in U.S. Pat. No. 6,503,990, which is incorporated by reference in its entirety. As described in that publication, quantities of peroxide are mixed with polymer resin in flake, powder, or pellet form to increase the MFR of the resin. MFR as defined herein refers to the quantity of a melted polymer resin that will flow through an orifice at a specified temperature and under a specified load. The MFR may be determined using a dead-weight piston Plastometer that extrudes polypropylene through an orifice of specified dimensions at a temperature of 230° C. and a load of 2.16 kg in accordance with ASTM D1238.

Representative examples of suitable PPHCs include without limitation 4920W and 4920WZ, which are impact copolymer resins commercially available from Total Petrochemicals USA Inc. In an embodiment, the PPHC (e.g., 4920W) has generally the physical properties set forth in Table 3.

TABLE 3

| Properties | Typical Value | ASTM Method |
|---|---|---|
| Physical | | |
| Melt Flow, g/10 min. | 100 | D1238 |
| Density, g/cc | 0.905 | D1505 |
| Melting Point, ° C. | 160-165 | DSC |

TABLE 3-continued

| Properties | Typical Value | ASTM Method |
|---|---|---|
| Mechanical | | |
| Tensile strength at Yield, psi (MPa) | 3700 (25) | D638 |
| Elongation at Yield, % | 6 | D638 |
| Flexural Modulus, psi (MPa) | 190,000 (1,300) | D790 |
| Notched-ft.lb./in. (J/m) | 1.0 (50) | ASTM D256A |
| Thermal | | |
| Heat Deflection, ° C. | 90 | D648 |

In an embodiment, the polypropylene may also contain additives to impart desired physical properties, such as printability, increased gloss, or a reduced blocking tendency. Examples of additives include without limitation stabilizers, ultra-violet screening agents, oxidants, anti-oxidants, anti-static agents, ultraviolet light absorbents, fire retardants, processing oils, mold release agents, coloring agents, pigments/dyes, fillers, and/or other additives known to one skilled in the art. The aforementioned additives may be used either singularly or in combination to form various formulations of the polymer. For example, stabilizers or stabilization agents may be employed to help protect the polymer resin from degradation due to exposure to excessive temperatures and/or ultraviolet light. These additives may be included in amounts effective to impart the desired properties. Effective additive amounts and processes for inclusion of these additives to polymeric compositions may be determined by one skilled in the art with the aid of this disclosure.

The polypropylene may be prepared using any suitable catalyst known to one or ordinary skill in the art. For example, the polypropylene may be prepared using a Ziegler-Natta catalyst, metallocene catalyst, or combinations thereof.

In an embodiment, the polypropylene is prepared using Ziegler-Natta catalysts, which are typically based on titanium and organometallic aluminum compounds, for example triethylaluminum $(C_2H_5)_3Al$. Ziegler-Natta catalysts and processes for forming such catalysts are known in the art and examples of such are described in U.S. Pat. Nos. 4,298,718; 4,544,717; and 4,767,735, each of which is incorporated by reference herein.

In another embodiment, the polypropylene may be prepared using a metallocene catalyst. Metallocene catalysts may be characterized generally as coordination compounds incorporating one or more cyclopentadienyl (Cp) groups (which may be substituted or unsubstituted, each substitution being the same or different) coordinated with a transition metal through $\pi$ bonding. Examples of metallocene catalysts and processes for forming such catalysts are described in U.S. Pat. Nos. 4,794,096 and 4,975,403, each of which is incorporated by reference herein. Examples of polypropylenes prepared through the use of metallocene catalysts are described in further detail in U.S. Pat. Nos. 5,158,920; 5,416,228; 5,789,502; 5,807,800; 5,968,864; 6,225,251; 6,777,366; 6,777,367; 6,579,962; 6,468,936; 6,579,962; and 6,432,860, each of which is incorporated by reference herein.

The polypropylene may also be prepared using any other catalyst such as a combination of Ziegler-Natta and metallocene catalysts, for example as described in U.S. Pat. Nos. 7,056,991 and 6,653,254, each of which is incorporated by reference herein.

The polypropylene may be formed by placing propylene alone in a suitable reaction vessel in the presence of a catalyst (e.g., Ziegler-Natta, metallocene, etc) and under suitable reaction conditions for polymerization thereof. Standard equipment and processes for polymerizing the propylene into a polymer are known to one skilled in the art. Such processes may include solution phase, gas phase, slurry phase, bulk phase, high pressure processes or combinations thereof. Such processes are described in detail in U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173, which are incorporated herein by reference in their entirety.

In an embodiment, the polypropylene is formed by a gas phase polymerization process. One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig, or from about 250 psig to about 350 psig. The reactor temperature in a gas phase process may vary from about 30° C. to about 120° C., or from about 60° C. to about 115° C., or from about 70° C. to about 110° C., or from about 70° C. to about 95° C., for example U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375; and 5,668,228, which are incorporated herein by reference in their entirety.

In an embodiment, the polypropylene is formed by a slurry phase polymerization process. Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutene). The medium employed is generally liquid under the conditions of polymerization and relatively inert. A bulk phase process is similar to that of a slurry process. However, a process may be a bulk process, a slurry process or a bulk slurry process.

In an embodiment, the polypropylene is present in the PP/PLA blend in an amount of from 51 weight percent (wt. %) to 99 wt. % by total weight of the PP/PLA blend, alternatively from 70 wt. % to 95 wt. %, alternatively from 80 wt. % to 90 wt. %.

In an embodiment, the PP/PLA blend comprises polylactic acid. Polylactic acid suitable for use in this disclosure may be of the type known in the art. For example, polylactic acid may comprise poly-L-lactide (PLLA), poly-D-lactide (PDLA), poly-LD-lactide (PDLLA), or combinations thereof. Polylactic acid may be prepared using any suitable method known to one or ordinary skill in the art. For example, polylactic acid may be prepared by dehydration condensation of lactic acid, such as described in U.S. Pat. No. 5,310,865, which is incorporated herein by reference in its entirety. Alternatively, polylactic acid may be prepared by synthesis of a cyclic lactide (also known as cyclic dimmer) from lactic acid followed by ring opening polymerization of the cyclic lactide. An example of such a process is described in U.S. Pat. No. 2,758,987, which is incorporated herein by reference in its entirety.

Catalysts may be used in the production of polylactic acid. The catalysts may be of any type suitable for the process. Examples of such catalysts include without limitation tin compounds such as tin octylate, titanium compounds such as tetraisopropyl titanate, zirconium compounds such as zirconium isopropoxide, and antimony compounds such as antimony trioxide.

Additives such as those described previously may be introduced to the polylactic acid composition. Additional processes to produce polylactic acid are described in U.S. Pat. Nos. 5,821,327; 5,770,682; 5,508,378; 5,470,944; and 4,797,468, which are incorporated herein by reference in their entirety.

In an embodiment, a polylactic acid suitable for use in this disclosure may have a density of from 1.238 g/cc to 1.265 g/cc, alternatively from 1.24 g/cc to 1.26 g/cc, and alternatively from 1.245 g/cc to 1.255 g/cc as determined in accordance with ASTM D792; a melt index (210° C., 2.16 kg) of from 5 g/10 min. to 35 g/10 min., alternatively from 10 g/10 min. to 30 g/10 min., and alternatively from 10 g/10 min. to 20 g/10 min as determined in accordance with ASTM D1238; a crystalline melt temperature of from 150° C. to 180° C., alternatively from 160° C. to 175° C., and alternatively from 160° C. to 170° C. as determined in accordance with ASTM D3418; a glass transition temperature of from 45° C. to 85° C., alternatively from 50° C. to 80° C., and alternatively from 55° C. to 75° C. as determined in accordance with ASTM D3417; a tensile yield strength of from 4,000 psi to 25,000 psi, alternatively from 5,000 psi to 20,000 psi, and alternatively from 5,500 psi to 20,000 psi as determined in accordance with ASTM D638; a tensile elongation of from 1.5% to 10%, alternatively from 2% to 8%, and alternatively of from 3% to 7% as determined in accordance with ASTM D638; a flexural modulus of from 250,000 psi to 600,000 psi, alternatively from 300,000 psi to 550,000 psi, and alternatively from 400,000 psi to 500,000 psi as determined in accordance with ASTM D790; a notched Izod impact of from 0.1 ft-lb/in to 0.8 ft-lb/in, alternatively from 0.2 ft-lb/in to 0.7 ft-lb/in, and alternatively from 0.4 ft-lb/in to 0.6 ft-lb/in as determined in accordance with ASTM D256.

An example of a polylactic acid suitable for use in this disclosure includes without limitation 3051D, which is commercially available from Nature Works LLC. In an embodiment, polylactic acid suitable for use in this disclosure (e.g., NatureWorks® 3051D) may generally have the physical properties set forth in Table 4.

TABLE 4

| Properties | Typical Value | Test Method |
|---|---|---|
| Physical | | |
| Density, g/cc | 1.25 | ASTM D792 |
| Melt Index (210° C., 2.16 kg), g/10 min. | 10-25 | ASTM D1238 |
| Crystalline Melt Temperature, ° C. | 150-165 | ASTM D3418 |
| Glass Transition Temperature, ° C. | 55-65 | ASTM D3417 |
| Mechanical | | |
| Tensile yield strength, psi | 7000 | ASTM D638 |
| Tensile elongation, % | 2.5 | ASTM D638 |
| Flexural Modulus, psi | 555,000 | ASTM D790 |
| Notched Izod impact, ft-lb/in | 0.3 | ASTM D256 |

In an embodiment, polylactic acid is present in the PP/PLA blend in an amount of from 1 wt. % to 40 wt. % weight by total weight of the PP/PLA blend, alternatively from 5 wt. % to 30 wt. %, alternatively from 10 wt. % to 20 wt. %.

Without wishing to be the limited by theory, the dispersed PLA phases in the PP/PLA blend may function as cavitating agents. Herein a cavitating agent refers to a compound(s) capable of generating voids in the structure of film during the film-making process.

In an embodiment, the PP/PLA blend further comprises a cavitating booster. Herein, a cavitating booster refers to a compound(s) capable of boosting the cavitating efficiency of PLA dispersed phase in the PP/PLA blend, and may broaden the processing window of the PP/PLA blend. The cavitating booster may comprise a functionalized polypropylene, for example a polypropylene that is functionalized with a polar monomer. Examples of such polar monomers include without limitation maleic anhydride (MAH); acrylic acid; alkyl acrylic acid; vinylsulfonic acid; acrylamido-2-methyl-propanesulfonic acid; alkyl sulfonic acid; acrylonitrile; acrylate esters for example methylmethacrylate; styrene sulfonic acid; and the like; and combinations thereof. In an embodiment, the cavitating booster comprises polypropylene functionalized with maleic anhydride which is hereinafter termed maleated polypropylene (PP-g-MAH).

Examples of cavitating boosters suitable for use in this disclosure include without limitation POLYBOND-3002 and X-10083, which are PP-g-MAH and both are commercially available from Crompton Corporation. In an embodiment, a cavitating booster suitable for use in this disclosure (e.g., POLYBOND-3002) may generally have the physical properties set forth in Table 5.

TABLE 5

| Physical Properties | POLYBOND-3002 Typical Value | Test Method |
|---|---|---|
| Melt Flow Rate (MFR), g/10 min. | 9.3 | ASTM D1238 |
| MAH Index | 0.6 | FTIR |
| % Moisture | 0.02 | ASTM D789 |
| Yellowness Index | 4 | ASTM D5290 |

In an embodiment, the cavitating booster is present in the PP/PLA blend in an amount of from 0.5 weight percent (wt. %) to 15 wt. % by total weight of the PP/PLA blend, alternatively from 2 wt. % to 10 wt. %, alternatively from 3 wt. % to 5 wt. %.

In an embodiment, the cavitating booster is a maleic anhydride grafted PP with MAH content in an amount of from 0.2 wt. % to 15 wt. % by total weight of maleated PP, alternatively from 0.5 wt. % to 10 wt. %, alternatively from 0.5 wt. % to 5 wt. %.

In an embodiment, a PP/PLA blend may be prepared by combining a PP homopolymer, a PLA homopolymer, and optionally a cavitating booster; each of the type described herein, using an extruder in a process known as extrusion compounding. Extrusion compounding refers to the process of mixing the polymers and optional additives to produce the desired blends. The mixing may be carried out using a continuous mixer such as for example a mixer consisting of a short non-intermeshing counter rotating twin screw extruder for mixing/melting the components of the PP/PLA blend and a single screw extruder or a gear pump for pumping.

The PP/PLA blends of this disclosure may be converted to end-use articles by any suitable method. In an embodiment, this conversion is a plastics shaping process such as known to one of ordinary skill in the art. Examples of end use articles into which the polymeric blend may be formed include food packaging, office supplies, plastic lumber, replacement lumber, patio decking, structural supports, laminate flooring compositions, polymeric foam substrate; decorative surfaces (i.e., crown molding, etc.) weatherable outdoor materials, point-of-purchase signs and displays, house wares and consumer goods, building insulation, cosmetics packaging, outdoor replacement materials, lids and containers (i.e., for deli, fruit, candies and cookies), appliances, utensils, electronic parts, automotive parts, enclosures, protective head gear, reusable paintballs, toys (e.g., LEGO bricks), musical instruments, golf club heads, piping, business machines and telephone components, shower heads, door handles, faucet handles, wheel covers, automotive front grilles, and so forth. Additional end use articles would be apparent to those skilled in the art. In an embodiment, PP/PLA blends are use for the production of BOPP films as will be described in more detail herein.

Articles constructed from a PP/PLA blend of the type described herein may display improved mechanical, physical, and/or optical properties. In an embodiment, the PP/PLA blends of this disclosure are used to prepare an injection molded article. Such articles may display an increased tensile modulus. The tensile modulus is the ratio of stress to elastic strain in tension. Therefore, the larger the tensile modulus the more rigid the material, and the more stress required to produce a given amount of strain. In an embodiment, the article may exhibit a tensile modulus of from 190 kpsi to 350 kpsi, alternatively from 200 kpsi to 300 kpsi, alternatively from 220 kpsi to 250 kpsi as determined in accordance with ASTM D638.

In an embodiment, an article constructed from a PP/PLA blend of the type described herein display an impact strength comparable to that of the polypropylene homopolymer as reflected by the Izod impact strength of the compositions. Izod impact is defined as the kinetic energy needed to initiate a fracture in a specimen and continue the fracture until the specimen is broken. Tests of the Izod impact strength determine the resistance of a polymer sample to breakage by flexural shock as indicated by the energy expended from a pendulum type hammer in breaking a standard specimen in a single blow. The specimen is notched which serves to concentrate the stress and promote a brittle rather than ductile fracture. Specifically, the Izod impact test measures the amount of energy lost by the pendulum during the breakage of the test specimen. The energy lost by the pendulum is the sum of the energies required to initiate sample fracture, to propagate the fracture across the specimen, and any other energy loss associated with the measurement system (e.g., friction in the pendulum bearing, pendulum arm vibration, and sample toss energy). In an embodiment, the article may exhibit an Izod impact strength of from 0.2 ft-lb/in to 1.0 ft-lb/in, alternatively of from 0.3 ft-lb/in to 0.8 ft-lb/in, alternatively of from 0.5 ft-lb/in to 0.6 ft-lb/in, as determined in accordance with ASTM D256.

In an embodiment, an article constructed from a PP/PLA blend of the type described herein displays an increased tensile strength at yield. The tensile strength at yield is the force per unit area required to yield a material. In an embodiment, the article may exhibit a tensile strength at yield of from 3500 psi to 6000 psi, alternatively from 4000 psi to 5500 psi, alternatively from 4500 psi to 5000 psi, as determined in accordance with ASTM D882.

In an embodiment, an article constructed from a PP/PLA blend of the type described herein displays increased stiffness as reflected in an increased flexural modulus. The flexural modulus test in broad terms measures the force required to bend a sample material beam. The force is applied to the center of the sample beam, while the beam is supported on both ends. In an embodiment, the article may exhibit a flexural modulus of from 150 kpsi to 300 kpsi, alternatively from 180 kpsi to 250 kpsi, alternatively from 200 kpsi to 230 kpsi as determined in accordance with ASTM D790.

In an embodiment, the article is a film, alternatively a biaxially oriented film. Generally, orientation of a polymer composition refers to the process whereby directionality (the orientation of molecules relative to each other) is imposed upon the polymeric arrangements in the film. Such orientation is employed to impart desirable properties to films, such as toughness and opaqueness, for example. As used herein, the term "biaxial orientation" refers to a process in which a polymeric composition is heated to a temperature at or above its glass-transition temperature but below its crystalline melting point. Immediately following heating, the material may then be extruded into a film, and stretched in both a longitudinal direction (i.e., the machine direction) and in a transverse or lateral direction (i.e., the tenter direction). Such stretching may be carried out simultaneously or sequentially.

In an embodiment, a PP/PLA blend of the type described herein is heated in an extruder to a temperature of equal to or less than 210° C., or from 180° C. to 250° C., or from 200° C. to 220° C. The molten polymer may then exit through a die and the molten plaque may be used to form an extruded film, a cast film, a biaxially oriented film, or the like. In an embodiment, the molten plaque may exit through the die and be taken up onto a roller without additional stretching to form an extruded film. Alternatively, the molten plaque may exit through the die and be uniaxially stretched while being taken up onto a chill roller where it is cooled to produce a cast film.

In an embodiment, the molten plaque exits through the die and is passed over a first roller (e.g., a chill roller) which solidifies the polymeric composition (i.e. PP/PLA blend) into a film. Then, the film may be oriented by stretching such film in a longitudinal direction and in a transverse direction. The longitudinal orientation is generally accomplished through the use of two sequentially disposed rollers, the second (or fast roller) operating at a speed in relation to the slower roller corresponding to the desired orientation ratio. Longitudinal orientation may alternatively be accomplished through a series of rollers with increasing speeds, sometimes with additional intermediate rollers for temperature control and other functions.

After longitudinal orientation, the film may be cooled, pre-heated and passed into a lateral orientation section. The lateral orientation section may include, for example, a tenter frame mechanism, where the film is stressed in the transverse direction. Annealing and/or additional processing may follow such orientation.

Alternatively, the film may be stretched in both directions at same time. In an embodiment, the film may be produced using a stretching force of from 1.0 MPa to 30 MPa, alternatively from 3 MPa to 15 MPa, alternatively from 5 MPa to 10 MPa. In an embodiment, the film is oriented in the machine direction at a temperature of from 90° C. to 160° C., alternatively from 100° C. to 180° C., and is oriented in the transverse direction at a temperature of from 130° C. to 180° C., alternatively from 100° C. to 180° C.

The oriented films prepared from PP/PLA blends of this disclosure may display stiffness comparable to that of oriented films prepared from a PP homopolymer as reflected in a 1% secant modulus. The secant modulus is a measure of the stress to strain response of a material or the ability to withstand deformation under an applied force. In an embodiment, the PP/PLA blends disclosed herein may produce oriented films having a 1% secant modulus of from 200 kpsi to 400 kpsi, alternatively from 200 kpsi to 300 kpsi, alternatively from 220 kpsi to 280 kpsi, alternatively, from 240 kpsi to 260 kpsi, as determined in accordance with ASTM D882.

In an embodiment, an oriented film constructed from a PP/PLA blend of the type described herein displays comparable tensile properties to neat bi-axially oriented PP films as reflected in the tensile strength at break (also termed yield/break strength) and tensile elongation at break (also termed elongation at yield/break). The tests to determine tensile properties may be carried out in the machine direction (MD), which is parallel to the direction of polymer orientation and/or the transverse direction (TD), which is perpendicular to the direction of polymer orientation. The tensile strength at break is the force per unit area required to break a material. In an embodiment, the tensile strength at break in the MD ranges from 20 kpsi to 40 kpsi, or from 25 kpsi to 35 kpsi, or from 25 kpsi to 30 kpsi, as determined in accordance with ASTM D882. The tensile elongation at break is the percentage increase in length that occurs before a material breaks under tension. In an embodiment, the tensile elongation at break in the MD ranges from 50% to 150%, or from 80% to 120%, or from 90% to 100%, as determined in accordance with ASTM D882.

Without wishing to be limited by theory, on cooling, the molecular alignment imposed by stretching competes favorably with crystallization, and the drawn polymer molecules condense into a crystalline network with crystalline domains aligned in the direction of the stretching force. Additional disclosure on biaxial film production may be found in U.S. Pat. No. 4,029,876 and U.S. Pat. No. 2,178,104, each of which is incorporated by reference herein in its entirety.

Further, the films prepared from PP/PLA blends of the type described herein may form one or more layers of a multilayer film. The additional layers of the multilayer film may be any coextrudable film known in the art, such as syndiotactic polypropylene, low density polyethylene, linear low density polyethylene, medium density polyethylene, high density polyethylene, ethylene-propylene copolymers, butylenes-propylene copolymers, ethylene-butylene copolymers, ethylene-propylene-butylene terpolymers, ethylene-vinyl acetate copolymers, ethylene-vinyl alcohol copolymers, nylons, and the like, or combinations thereof.

In an embodiment, oriented films (e.g., biaxially oriented films) produced from a PP/PLA blend of the type described herein are opaque. Opaque films generally have a void content (e.g., porosity) measured by density of from 0.5 grams per cubic centimeter (g/cm$^3$) to 0.95 g/cm$^3$, or from 0.6 g/cm$^3$ to 0.9 g/cm$^3$, or from 0.5 g/cm$^3$ to 0.8 g/cm$^3$, or from 0.5 g/cm$^3$ to 0.7 g/cm$^3$. Such opaque films may be formed from a polymeric composition comprising a PP matrix, PLA dispersed phase as cavitating agent, and/or a cavitating booster (e.g., PP-g-MAH) all of the type described previously herein using the methodologies also previously described herein. In an embodiment, the PP/PLA blends may further comprise one or more inorganic fillers such as calcium carbonate, titanium dioxide, kaolin, alumina trihydrate, calcium sulfate, talc, mica, glass microspheres, or combinations thereof. The presence of such inorganic fillers may further improve the film opacity. The inorganic fillers may be present in an amount of from 1 wt. % to 20 wt. %, alternatively from 1 wt. % to 15 wt. %, alternatively from 1 wt. % to 10 wt. %.

The BOPP film produced from the PP/PLA blends disclosed herein may display improved optical properties, barrier properties and/or printability when compared to a similar BOPP film produced using an otherwise similar PP homopolymer or otherwise similar PLA homopolymer.

In an embodiment, BOPP film produced from the PP/PLA blends disclosed herein display increased gloss. The gloss of a material is based on the interaction of light with the surface of a material, more specifically the ability of the surface to reflect light in a specular direction. Gloss is measured by measuring the degree of gloss as a function of the angle of the incident light, for example at 45° incident angle (also known as "gloss 45°"). In an embodiment, the BOPP films produced from PP/PLA blends of the type described herein have a gloss 45° of from 50 to 125, or from 80 to 120, or from 100 to 120, as determined in accordance with ASTM D2457.

Haze is the cloudy appearance of a material cause by light scattered from within the material or from its surface. The haze of a material can be determined in accordance with ASTM D1003-00 for a haze percentage of equal to or lower than 30%. A material having a haze percentage of greater than 30% can be determined in accordance with ASTM E167. In an embodiment, the BOPP films produced from PP/PLA blends of the type described herein have a haze percentage of from 8% to 90%, or from 10% to 95%, or from 20% to 90%, or from 10% to 90%, as determined in accordance with ASTM D1003.

In an embodiment, BOPP film produced from the PP/PLA blends disclosed herein display shrinkage comparable to a BOPP film prepared from a PP homopolymer. Film shrinkage may be calculated by first measuring the length of contraction upon cooling in the in-flow direction (termed MD when measuring differential shrinkage) and the length of contraction occurring in the cross-flow direction (termed TD when measuring differential shrinkage). The difference in the in-flow and cross-flow contractions at a given temperature, multiplied by 100% gives the percent shrinkage. In an embodiment, the film has shrinkage of from 1% to 15%.

BOPP films produced from the PP/PLA blends of this disclosure may display improved oxygen barrier properties as reflected by the decreased oxygen transmission rate (OTR). OTR is the steady state rate at which oxygen gas permeates through a film at specified conditions of temperature and relative humidity. OTR may be measured by exposing one side of a film to an oxygen atmosphere. As the oxygen solubilizes into the film and permeates through the material, nitrogen sweeps the opposite side of the film and transports the transmitted oxygen molecules to a coulometric sensor. This value is reported as a transmission rate. When this rate is multiplied by the average thickness of the material, the results are considered a permeability rate. In an embodiment, 1 mil BOPP films produced from the PP/PLA blends of this disclosure have oxygen transmission rates of from 150 to 450 cc/100 in$^2$/24 h at 100° F., or of from 300 to 450 cc/100 in$^2$/24 h at 100° F., or from 300 to 400 cc/100 in$^2$/24 h at 100° F., or from 300 to 350 cc/100 in$^2$/24 h at 100° F., or from 150 to 250 cc/100 in$^2$/24 h at 100° F., as determined in accordance with ASTM D3895.

BOPP films produced from the PP/PLA blends of this disclosure may display an increased water vapor transmission rate (WVTR). In an embodiment, 1 mil thick BOPP films produced from the PP/PLA blends of this disclosure have water vapor transmission rates of from 0.8 to 2 g/100 in$^2$/24 h at 100° F., or from 0.8 to 1.5 g/100 in$^2$/24 h at 100° F., or from 0.8 to 1.0 g/100 in$^2$/24 h at 100° F., as determined in accordance with ASTM F1249.

Cast films produced from the PP/PLA blends of this disclosure may display an increased surface tension. The surface tension of the cast films produced from the PP/PLA blends of this disclosure may be determined by determining the contact angle between a droplet of water and the BOPP film. The contact angle is the angle at which a liquid/vapor (e.g., water droplet) interface meets the surface of the film. In an embodiment, the film may have a contact angle of from 85 to 110 degrees.

EXAMPLES

The disclosure having been generally described, the following examples are given as particular embodiments of the disclosure and to demonstrate the practice and advantages thereof. It is understood that the examples are given by way of illustration and are not intended to limit the specification or the claims to follow in any manner.

Example 1

The melt pressures of PP/PLA blends made with and without a cavitating booster were investigated. Sample 1 was prepared by blending Total Petrochemicals polypropylene 3271 with 10% PLA 6201D (previously dried at 75° C. for 6 hours under vacuum prior to extrusion). Sample 2 was prepared by blending 3271, 10% PLA 6201, and 5% POLYBOND 3002 containing 0.6% maleic anhydride (MAH) grafted onto polypropylene (maleated polypropylene). The blended mixtures were extruded in a 27 mm co-rotating twin screw extruder. The screw speed of the extruder was set at 100 rpm and the output rate was at 15 lbs/hr. Devol ports were vacuumed to remove any volatiles generated during extrusion. The melt flow rates (MFR) of the blends are given in Table 6.

TABLE 6

| Sample | Blends | MFR |
| --- | --- | --- |
| 1 | PP/PLA | 2.2 |
| 2 | PP/PLA/POLYBOND | 2.7 |

The melt pressure data as a function of extrusion time is shown in FIG. 1. Referring to FIG. 1, Sample 2 (containing the cavitating agent) had a higher melt pressure at earlier extrusion times. Later times show that the melt pressure of Sample 2 had stabilized resulting in the final melt pressures of the samples being similar.

Figure 2:
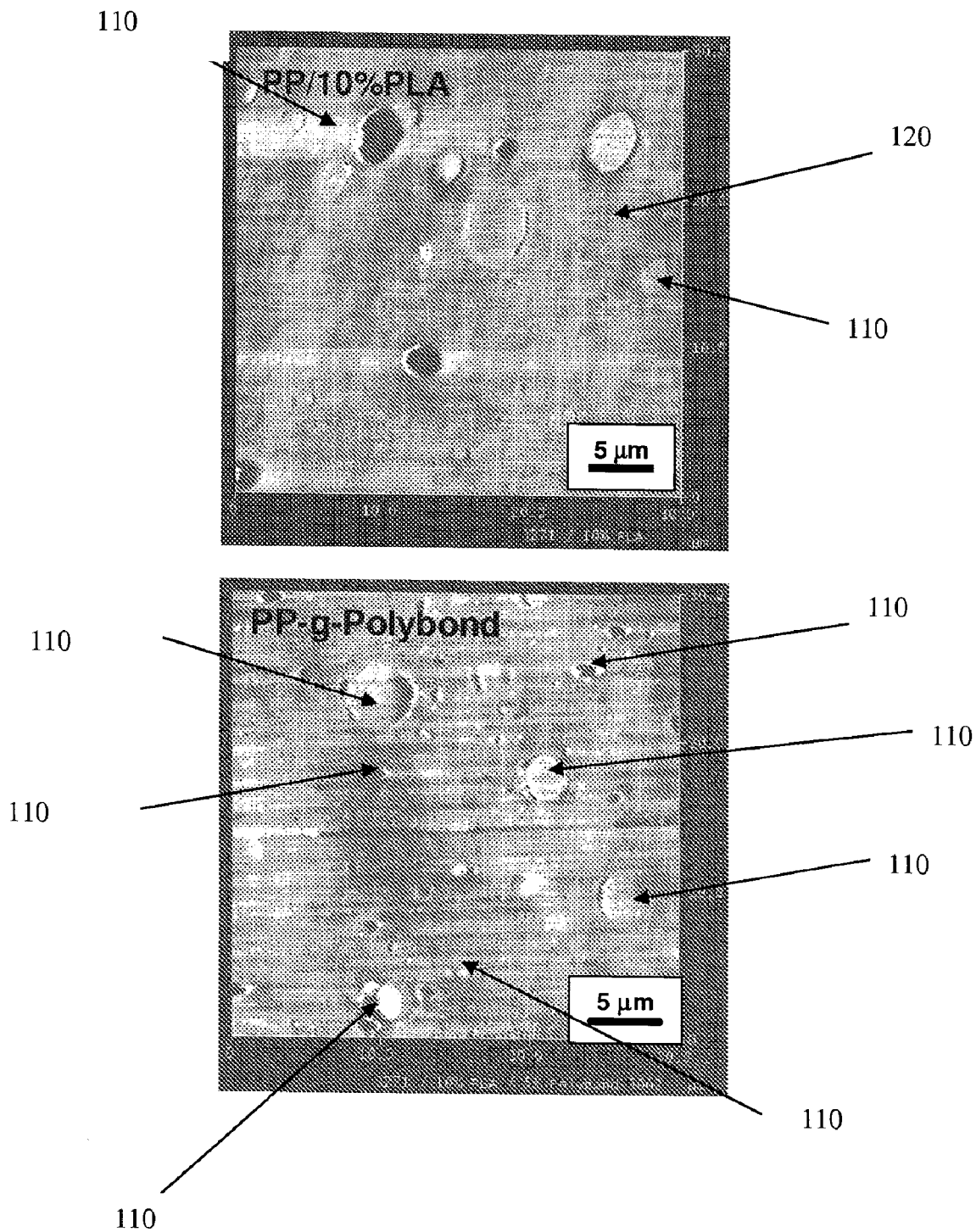
FIG. 2 presents atomic force microscopy pictures for the samples from Example 1.

Extruded pellets of both samples were compression molded and subsequently characterized for the extent of phase dispersion of PLA in the PP via Atomic Force Microscopy (AFM). AFM images of both samples are shown in FIG. 2. Referring to FIG. 2, both samples are shown form immiscible blends wherein the PLA, appearing as circular bodies 110, is dispersed in a polypropylene continuous phase, 120. In Sample 1, PLA was seen to form bodies of various sizes within PP with some of the bodies having sizes larger than 5 micrometer (μm). In comparison Sample 2, prepared with a cavitating booster, displays a similar amount of PLA 110 dispersed within the PP. Without wishing to be limited by theory, the cavitating booster, maleated polypropylene, may introduce some polar interactions and H-bonding between PP and PLA phases and may help PLA dispersion to a certain degree.

Example 2

The yield strengths of various PP/PLA blends were investigated and compared to PP. Three samples designated Samples 3-5 each containing PP and PLA were prepared. Sample 4 additionally contained the cavitating agent POLYBOND 3002 while Sample 5 contained the cavitating booster X-10083, a highly maleated PP with 32% MAH. The amounts of all components are presented in Table 7. The samples were prepared as described in Example 1 and cast into 16 mil thick sheets and stretched using a Brückner Karo IV. The areal draw ratio was 6×6 with a stretching speed of 30 m/min in both machine and transverse directions. The materials could be stretched with a broad temperature window of 130° C. to 155° C.

TABLE 7

| Sample | Description |
| --- | --- |
| 3 | 3271/10% PLA |
| 4 | 3271/10% PLA/5% Polybond-3002 |
| 5 | 3271/10% PLA/X-10083 |

Figure 3:
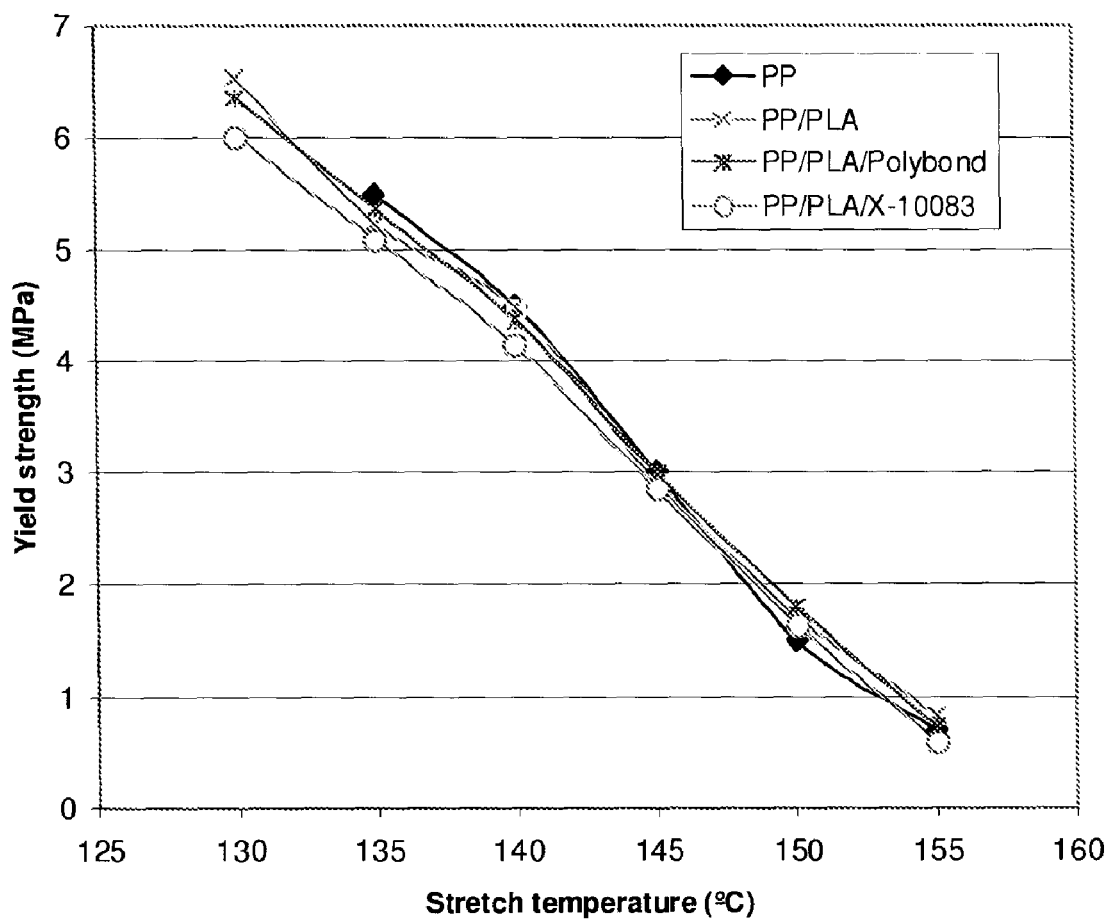
FIG. 3 is a plot of stretch yield strength as a function of oven temperature for the samples from Example 2.

The results are tabulated in Table 8 and plotted in FIG. 3.

TABLE 8

| Stretch | Yield Strength, MPa | | | |
| --- | --- | --- | --- | --- |
| Temperature, ° C. | PP 3271 | Sample 3 PP/PLA | Sample 4 PP/PLA/Polybond | Sample 5 PP/PLA/X-10083 |
| 130 | n/a | 6.54 | 6.36 | 6.02 |
| 135 | 5.5 | 5.24 | 5.37 | 5.1 |
| 140 | 4.5 | 4.48 | 4.37 | 4.14 |
| 145 | 3 | 2.92 | 3 | 2.85 |
| 150 | 1.5 | 1.72 | 1.8 | 1.64 |
| 155 | 0.7 | 0.84 | 0.73 | 0.6 |

FIG. 3 is a plot of stretching yield strength in the machine direction as a function of stretch temperatures. The results demonstrate that the blend materials could be stretched within a broad temperature window of 130~155° C. Overall, almost all of the materials could be stretched at a comparable stretching force to the neat polypropylene resin at a given temperature. Polypropylene resins with PLA and or maleated PP are thus suitable for bi-axial orientation processing.

Example 3

The optical properties for film prepared using the samples from Example 2 (Samples 3-5) were investigated and compared to PP. Samples 3-5 were stretched at 135° C. to make BOPP films. The haze and gloss 45° of the samples were determined together with those of neat polypropylene samples in accordance with ASTM methods D1003-00 and D2457 respectively, the results are tabulated in Table 9 and plotted in FIG. 4.

TABLE 9

| Samples | Haze (%) | Gloss (%) |
| --- | --- | --- |
| PP 3271 | 0.5 | 93 |
| Sample 3 PP/PLA | 67.8 | 113.3 |
| Sample 4 PP/PLA/Polybond | 49.9 | 107.9 |
| Sample 5 PP/PLA/X-10083 | 80.4 | 117.4 |

Figure 4:
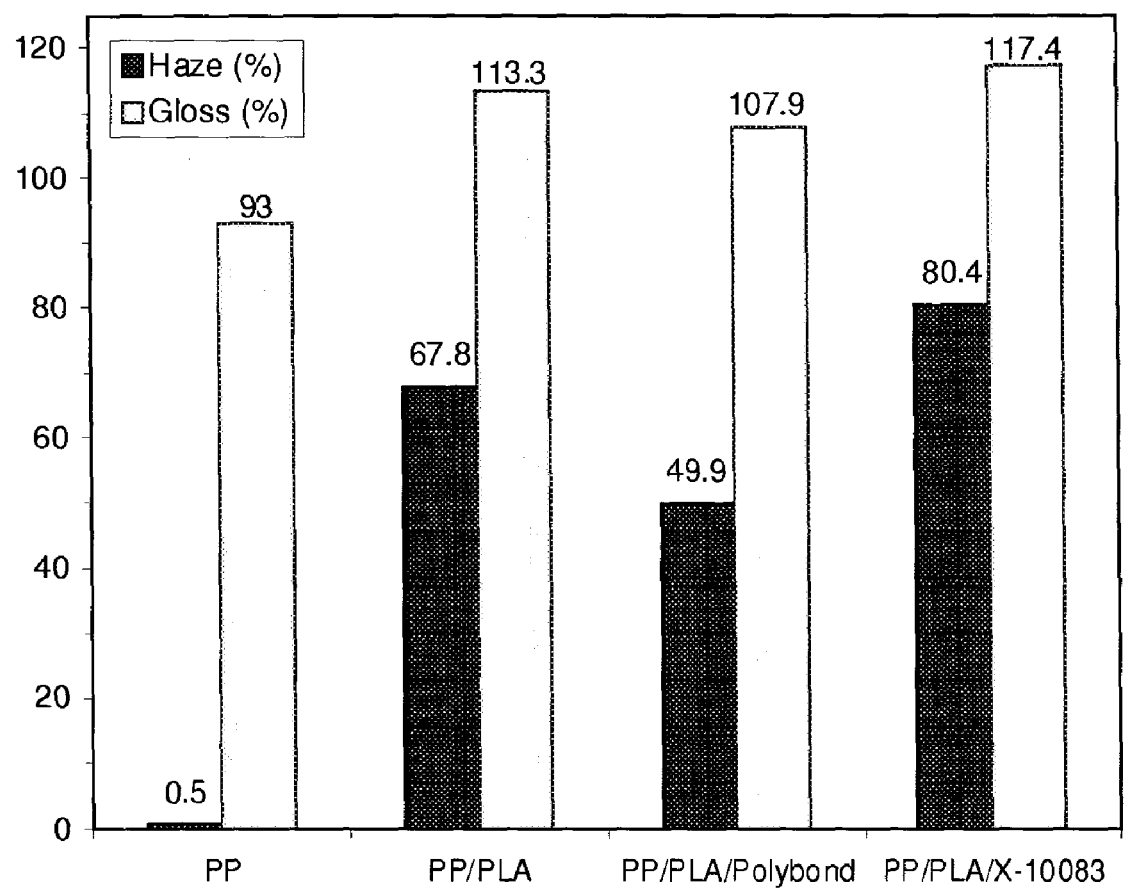
FIG. 4 is a plot of haze and gloss 45° at a stretch temperature of 135° C. for the samples from Example 2.

The results demonstrate the presence of PLA with or without maleated PP significantly increased the haze of the bi-axially oriented films, indicating cavitation occurred in PP/PLA oriented films. Referring to FIG. 4, BOPP films of PP/PLA blend (Sample 3) appeared hazy with a haze percentage of about 68%. The presence of POLYBOND-3002 in Sample 4 reduced the haze percentage to about 50% while Sample 5 prepared with X-10083 had a percentage of about 80%. The gloss 45° of the samples exhibited a similar trend. Compared to Sample 3 with a gloss 45° of 113%, POLYBOND-3002 reduced the gloss 45° to 108% and X-10083 increased the gloss 45° to 117%. All the films produced in this example appeared much glossier than neat PP films.

Example 4

Figure 5:
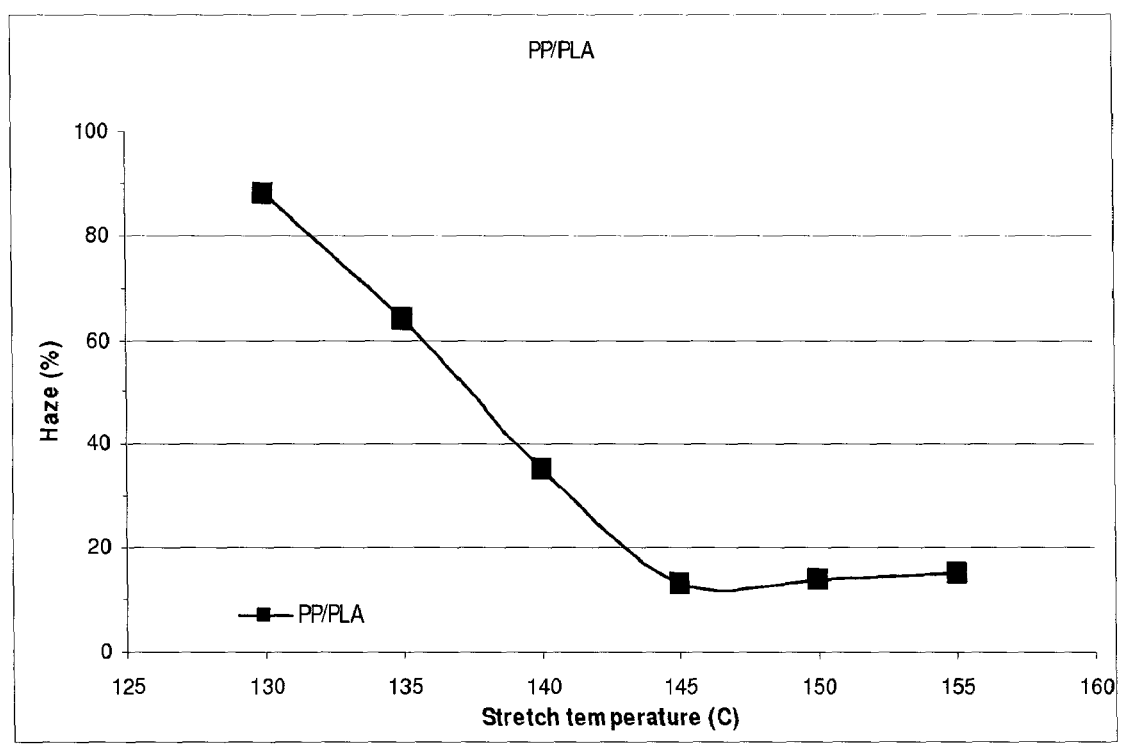
FIG. 5 is a plot of haze percentage as a function of stretch temperature for the samples from Example 2.

The haze of a BOPP film produced from a PP/PLA blend prepared in the absence of maleated PP as a cavitating booster was further investigated. A film prepared from Sample 3 (see Example 2) was stretched at six different stretch temperatures ranging from 130° C. to 155° C. The haze percentage for each condition was then determined and the results are tabulated in Table 10 and shown in FIG. 5 where haze percentage is plotted as a function of stretch temperature.

TABLE 10

| Stretch Temperature, ° C. | Haze, % |
|---|---|
| 130 | 88 |
| 135 | 64 |
| 140 | 35 |
| 145 | 13 |
| 150 | 14 |
| 155 | 15 |

The results demonstrate that the PP/PLA blend prepared in the absence of a cavitating agent displayed increasing haze when stretched at lower temperatures. Haze percentage decreased with increasing stretch temperatures in the temperature range of 130° C. to 145° C. The haze percentage reached its lowest value at 145° C. with minimal changes in the haze occurring as the temperature was increased to 155° C.

The gloss 45° at various stretch temperatures for Sample 3 was also investigated. The results are tabulated in Table 11 and shown in FIG. 6.

TABLE 11

| Stretch Temperature, ° C. | Gloss 45° |
|---|---|
| 130 | 123 |
| 135 | 106 |
| 140 | 86 |
| 145 | 56 |
| 150 | 51 |
| 155 | 51 |

Figure 6:
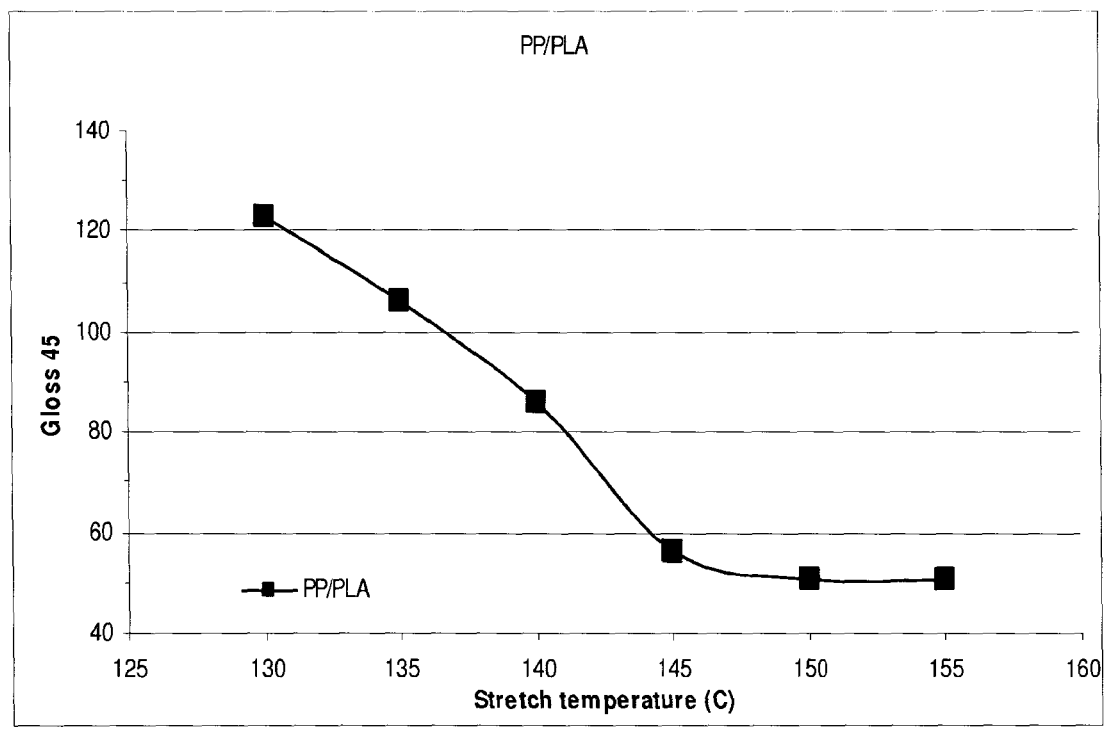
FIG. 6 is a plot of gloss 45° as a function of stretch temperature for the samples from Example 2.

FIG. 6 is a plot of gloss 45° as a function of stretch temperature. The trend observed for gloss 45° as a function of stretch temperature was observed to be similar to the trend observed for the haze percentage as a function of stretch temperature. Referring to FIG. 6, the sample had its highest gloss value at the lowest stretch temperature, 130° C. The gloss 45° for Sample 3 decreased with increasing stretch temperatures in the temperature range of 130° C. to 145° C. The gloss 45° reached its lowest value at 145° C. with minimal changes in the gloss 45° occurring as the temperature was increased to 155° C.

Figure 7:
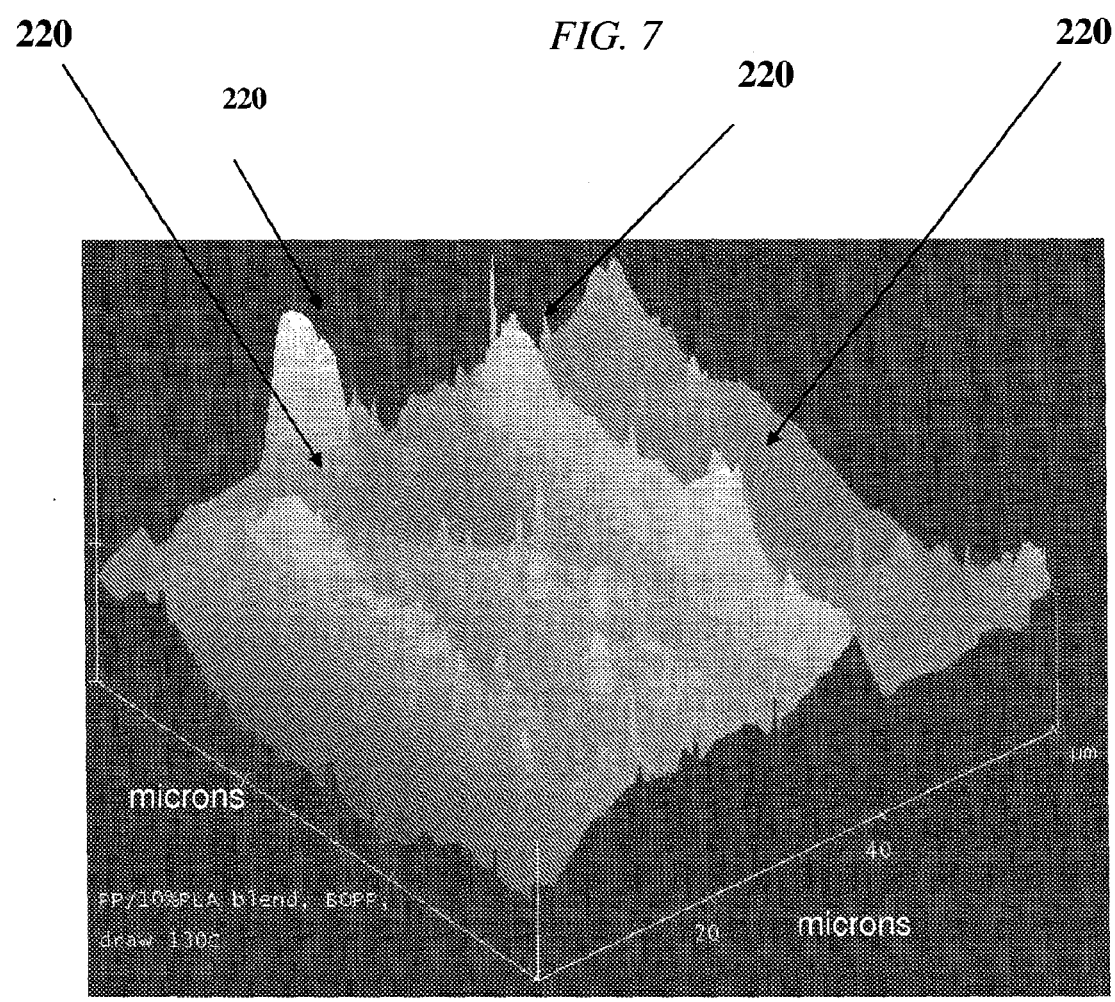
FIG. 7 is an AFM picture of surface roughness at a stretch temperature of 130° C. for the samples from Example 2.
Figure 8:
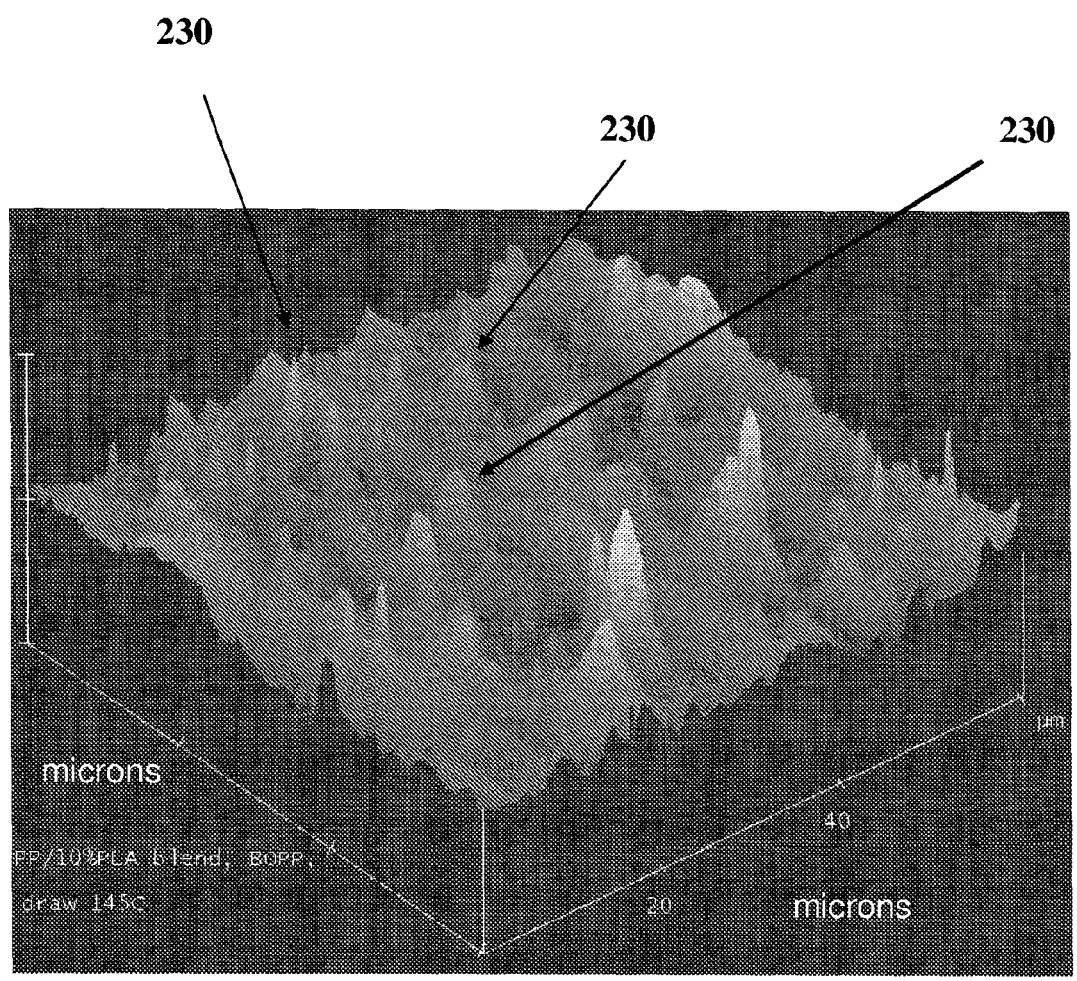
FIG. 8 is an AFM picture of surface roughness at a stretch temperature of 145° C. for the samples from Example 2.

The surface roughness for Sample 3 was also investigated. Without wishing to be limited by theory, surface haze usually contributes significantly to the film total haze since the surfaces are usually rougher for high haze BOPP films. AFM pictures were obtained for both Samples 3 and 4 from Example 2 at two stretch temperatures 130° C. and 145° C., as shown in FIGS. 7 and 8, respectively. The surface roughness was also quantified based on the AFM pictures and the results are shown in Table 12. Ra is the most commonly used parameter to describe the average surface roughness and is defined as an integral of the absolute value of the roughness profile measured over an evaluation length. Z-range refers to the average displacement in the z-direction, reflecting peak-to-valley surface roughness.

TABLE 12

| | | | | | Roughness | | | |
| | | | | | Ra (nm) | | Z Range (µm) | |
| Sample | PP | PLA | Draw Ratio | Temp ° C. | Avg | Std Dev | Avg | Std Dev |
|---|---|---|---|---|---|---|---|---|
| 10 | PP/ | 90 | 10 | 6 × 6 | 130 | 155.56 | 48.9 | 1.9 | 0.75 |
| | PLA | 90 | 10 | 6 × 6 | 145 | 89.25 | 19.44 | 1.66 | 0.74 |

FIGS. 7 and 8 are on the same scale. Referring to FIG. 7, Sample 3 at 130° C. stretch temperature showed a large number of high amplitude broad non Gaussian peaks, 220 which tended to substantially overlap. In comparison, Sample 3 stretched at 145° C. tended to have a fewer number of peaks, 230, that were generally Gaussian in appearance with lower amplitude, FIG. 8. Thus, the surface of the sample stretched at 145° C. appeared smoother than the same sample stretched at 130° C. It is interesting to notice that Sample 3 has high haze percentage as well as high gloss 45° at 130° C. This is unexpected as a polymer sample typically displays an inverse relationship between haze and gloss. For example, a sample exhibiting high haze typically has a low gloss. Sample 3 having both high haze and high gloss at 130° C. results in a unique film appearance similar to that seen with metallic films such as aluminum foils. Without wishing to be limited by theory, the high gloss may be related to the presence of PLA phases on the surface.

Example 5

The printability of the PP/PLA blend was investigated by determining the degree of surface tension for one of these blends. Specifically, the contact angle for a film prepared from a PP/PLA blend was determined and compared to the contact angle for a film prepared from a polypropylene homopolymer. Three samples of cast film (Sample 6), cast sheets for BOPP (Sample 7), and BOPP films (Sample 8) were prepared from polypropylene (Total Petrochemicals polypropylene 3271) and PP/PLA blend with 10% PLA (PLA-6201D Lot#WD0294 Terramac Unitika Ltd). The results are tabulated in Table 13.

TABLE 13

| Sample | Contact Angle Results | PP | PP/PLA |
|---|---|---|---|
| 6 | Cast Film | 106° | 102° |
| 7 | Cast Sheets for BOPP | 106° | 100° |
| 8 | BOPP Films | 107° | 106° |

The results demonstrate that the contact angles for materials made with the PP/PLA blend are only slightly lower than polypropylene. Thus, the surface tensions for PP/PLA are comparable to those of polypropylene.

The effect of using different polypropylene homopolymers in the PP/PLA blend on the printability of films prepared from these blends was investigated. Cast films, designated Samples 10-12. Sample 11 contained Total Petrochemicals PPH 5060 which is a homopolymer polypropylene having a melt flow rate of 6 g/10 min. while Sample 12 contained Total Petrochemicals MR 2002 is a homopolymer polypropylene prepared with a metallocene catalyst having a melt flow rate of 15.0 g/10 min. Both PPH 5060 and MR 2002 are commercially available from Total Petrochemicals. Samples 11 and 12 additionally contained 10% PLA. Sample 10 was a comparative sample which contained Total Petrochemicals 3271 polypropylene homopolymer. The contact angles for these films were determined and are tabulated in Table 14.

TABLE 14

| Sample | Cast Film | Contact Angle |
|---|---|---|
| 10 | PP | 106° |
| 11 | PPH5060/PLA | 90° |
| 12 | MR2002/PLA | 98° |

The results demonstrate that the contact angle for films prepared from a PP/PLA blend containing PPH 5060 was slightly lower than for films prepared from a PP/PLA blend containing MR 2002 which was also slightly lower than Total Petrochemicals 3271. Lower contact angles suggest higher surface tension, which is an indication that the film has good printability properties. The results indicated that cast film printability could be improved to a degree if certain propylene resin was blended with PLA.

Example 6

Several mechanical properties of the BOPP films were determined prepared from Samples 3 from Example 2 and compared to PP. The 1% secant modulus, tensile strength at break, and the elongation at break were determined in the machine direction (MD) and the results are tabulated in Table 15 and plotted in FIG. 9.

TABLE 15

|  | PP 3271 | Sample 3 PP/PLA |
|---|---|---|
| 1% Secant Modulus, kpsi | 256 | 244 |
| Tensile strength at break, kpsi | 30.5 | 23.8 |
| Elongation at break (MD) | 96.7 | 73.6 |

Figure 9:
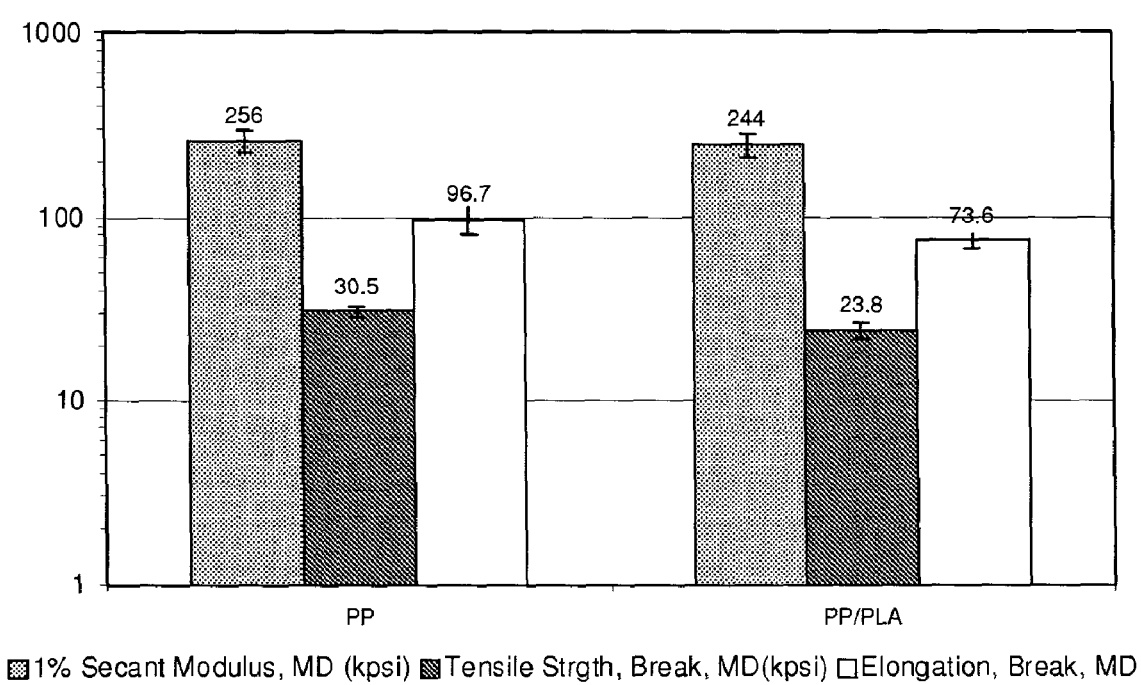
FIG. 9 is a plot of storage modulus, tensile strength at break, and elongation at break as a function of stretch temperature for the samples from Example 6.

Since PLA has a higher modulus than PP, the presence of PLA in films made from PP/PLA blend is expected to increase the stiffness of the film. Referring to FIG. 9, films made from PP/PLA blend shows a 1% secant modulus that is comparable to the polypropylene homopolymer however; the PP/PLA blend shows a reduced tensile strength at break and elongation at break when compared to the homopolymer.

Example 7

The tensile properties, flexural modulus and Izod impact of a specimen prepared by injection molding of Total Petrochemicals 3271, was compared to a specimen prepared by injection molding of a PP/PLA blend containing 10% PLA. The results are tabulated in Table 16.

TABLE 16

| Parameters | PP Sample 13 | PP/10% PLA Sample 14 |
|---|---|---|
| Tensile (ASTM) | | |
| Tensile Modulus (kpsi) | 220 | 236 |
| Yield Strength (psi) | 4630 | 4900 |
| Break Strength (psi) | 2360 | 1710 |
| Yield Elongation (%) | 9.2 | 6.4 |
| Break Elongation (%) | 50 | 46 |
| Flexural Modulus (kpsi) | 186 | 233 |
| Izod Impact (ft-lb/in) | 0.6 | 0.61 |

The results demonstrate that for injection molded samples, unlike BOPP films, the PP/PLA blends possess higher stiffness than PP. Without wishing to be limited by theory, this observation may be due to the compromise of the interfacial interface (such as cavitation) during bi-axial orientation in BOPP films. For injection molded samples, the interfacial adhesion between PP and PLA remains intact, making it possible to take advantage of the high stiffness PLA to a certain extent even in PP/PLA blend.

Example 8

The shrinkage, OTR and WVTR of BOPP films prepared from a PP/PLA blend were investigated. Two samples were prepared to contain either PP or PP/10% PLA and designated Samples 15 and 16 respectively. The samples were used to prepare BOPP film as described in Example 2 at the indicated stretch temperatures. The OTR, WVTR, and shrinkage for each sample was determined as discussed previously and the results are tabulated in Table 17.

TABLE 17

| | BOPP Films | | |
|---|---|---|---|
| | PP Sample 15 | PP/PLA Sample 16 | |
| | Stretch Temperatures | | |
| | 135° C. | 135° C. | 145° C. |
| BOPP Thickness (mil) | 0.53 | 0.6 | 0.51 |
| OTR (cc/100 in2/day) | 231.5 | 181.7 | 197.8 |
| WVTR (g/100 in2/day) | 0.45 | 0.84 | 0.89 |
| MD Shrinkage (%) | 10.6 | 11.8 | — |
| TD Shrinkage (%) | 10.6 | 11.7 | — |

From Table 17, the difference in shrinkages for BOPP films at 135° C. with and without PLA is minimal. A slight decrease in the OTR for PP/PLA was observed when compared to PP. The PP/PLA blend oriented films showed increased transmission rate to water moisture probably due to the polarity of PLA components. In addition, the PP/PLA blend film when stretched at 135° C. appeared to be relatively opaque compared to the one stretched at 145° C. which appeared to be relatively clear. However, the PP/PLA blends stretched at different temperatures displayed similar OTRs. Overall, oriented films prepared from the PP/PLA blends described herein possessed slightly improved barrier property to oxygen and lowered barrier to moisture.

Example 9

Cavitation in BOPP films produced from the samples from Example 2 was investigated and compared to PP. All BOPP films (Samples 3-5) stretched at low temperatures (i.e., 135°

C.) appeared to be opaque with a silver luster. Without wishing to be limited by theory, these results were believed to be an indication that the PLA dispersed phase acts as cavitating agent during bi-axial orientation. Since cavitation relates to film density, the density of the films from Example 2 were determined and compared to the density of BOPP film prepared from polypropylene. The results are tabulated in Tables 18, 19, and shown in FIGS. 10 and 11.

TABLE 18

|  | BOPP Film Density, g/cm³ at 135° C. | BOPP Film Density, g/cm³ at 145° C. |
|---|---|---|
| PP 3271 | 0.87 | 0.88 |
| Sample 3 PP/PLA | 0.81 | 0.87 |
| Sample 4 PP/PLA/Polybond | 0.79 | 0.82 |
| Sample 5 PP/PLA/X-10083 | 0.83 | 0.86 |

Figure 10:
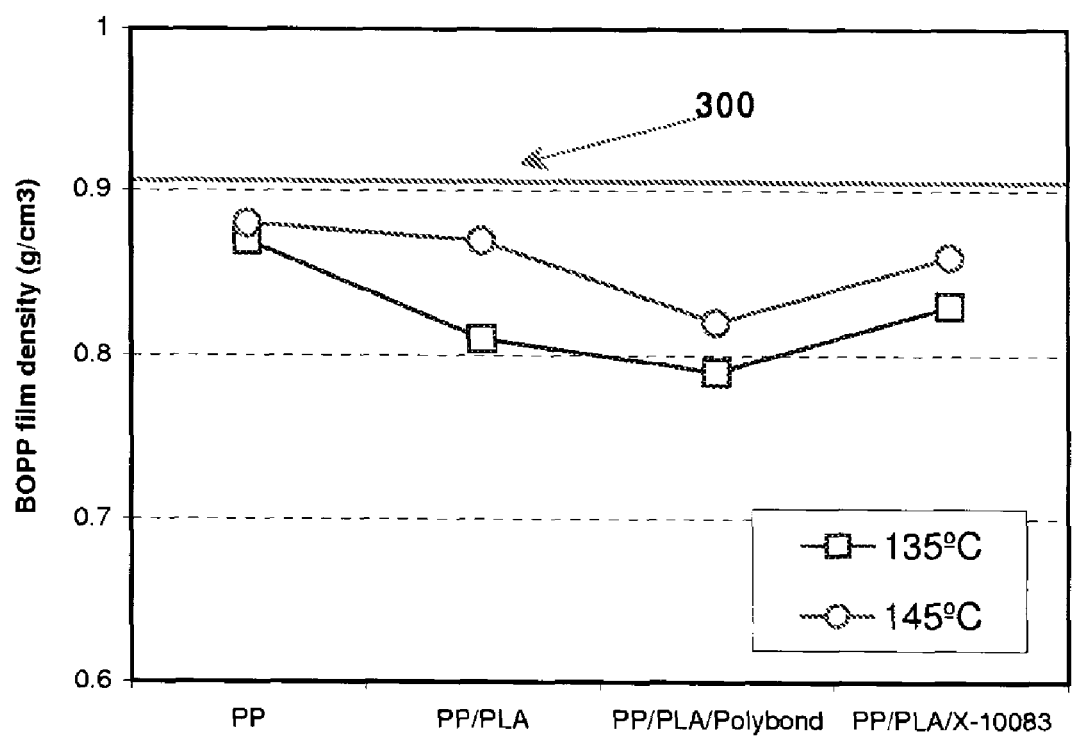
FIG. 10 is a plot of film density produced at stretch temperatures of 130° C. and 145° C. for the samples from Example 2.

FIG. 10 is a plot of BOPP film density at stretch temperatures of 135° C. and 145° C. for a PP homopolymer Total Petrochemicals 3371 and Samples 3-5. The expected density of a PP/PLA blend was calculated and is shown as reference line 300. The reference line was calculated using the following equation:

$$\Phi_{PP}\rho_{PP} + \Phi_{PLA}\rho_{PLA},$$

in which $\Phi$ and $\rho$ are the volume fraction and density of individual components in the blends, respectively. Referring to FIG. 10, polypropylene films stretched at both low and high temperatures appear to possess comparable film densities. However, the PP/PLA blends resulted in films with lower densities than expected, suggesting the presence of voids in the films. Without wishing to be limited by theory, a high modulus dispersed phase is required to facilitate cavitation because it does not deform or orient along with the polypropylene matrix during bi-axial orientation, thus initiating the formation of voids at the matrix-particle boundaries.

TABLE 19

| Stretch Temperature, ° C. | BOPP Film Density, g/cm³ Sample 3 PP/PLA | BOPP Film Density, g/cm³ Sample 4 PP/PLA/Polybond | BOPP Film Density, g/cm³ Sample 5 PP/PLA/X-10083 |
|---|---|---|---|
| 130 | 0.76 | 0.71 | 0.82 |
| 135 | 0.81 | 0.79 | 0.83 |
| 140 | 0.83 | 0.84 | 0.86 |
| 145 | 0.87 | 0.83 | 0.86 |
| 150 | 0.86 | 0.84 | 0.85 |

Figure 11:
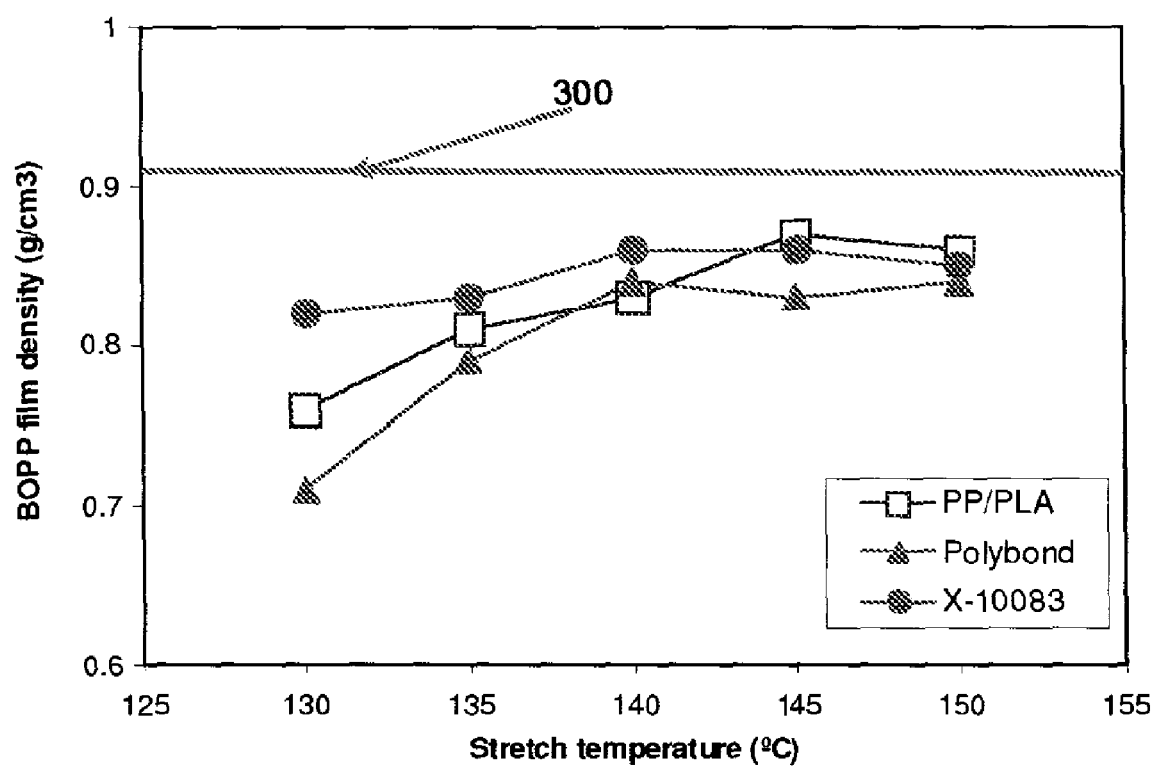
FIG. 11 is a plot of film density produced at a road range of temperatures for the samples from Example 2.

Referring to FIG. 11, addition of POLYBOND facilitated PP film cavitation even at high stretch temperatures, indicating a synergistic effect of maleated PP (i.e., POLYBOND) and PLA for cavitating. However, X-10083 with much higher degree of maleation did not exhibit any synergistic effect for PP film cavitation. It follows that maleated PP with appropriate degrees of maleation is able to boost PLA cavitating of oriented PP films.

Example 10

The density of BOPP films at a higher PLA amount was investigated. Three BOPP samples, designated Samples 17, 18, and 19, were prepared. Sample 17 was prepared from Total Petrochemicals polypropylene 3371, Sample 18 was prepared by blending 70% Total Petrochemicals polypropylene and 30% PLA 6201, and Sample 19 was prepared by blending 70% Total Petrochemicals polypropylene and 30% PLA 6201, and 3% Polybond. All samples were then stretched for bi-axial orientation using a Bruckner Karo IV at a stretch speed of 30 m/min and a simultaneous 6×6 draw ratio. However, Samples 18 and 19 could not be readily stretched as such conditions. The conditions were revised to a stretch speed of 3 m/min and a simultaneous 4×4 draw ratio. The stretching was carried out at a temperature range of from about 145° C. to about 155° C. The results are tabulated in Table 20 and shown in FIG. 12.

TABLE 20

| Stretch Temperature ° C. | Sample 17 BOPP density, g/cc | Sample 18 BOPP density, g/cc | Sample 19 BOPP density, g/cc |
|---|---|---|---|
| 145 | 0.89 | 0.32 | n/a |
| 150 | 0.9 | 0.43 | n/a |
| 55 | 0.83 | 0.56 | 0.57 |

Figure 12:
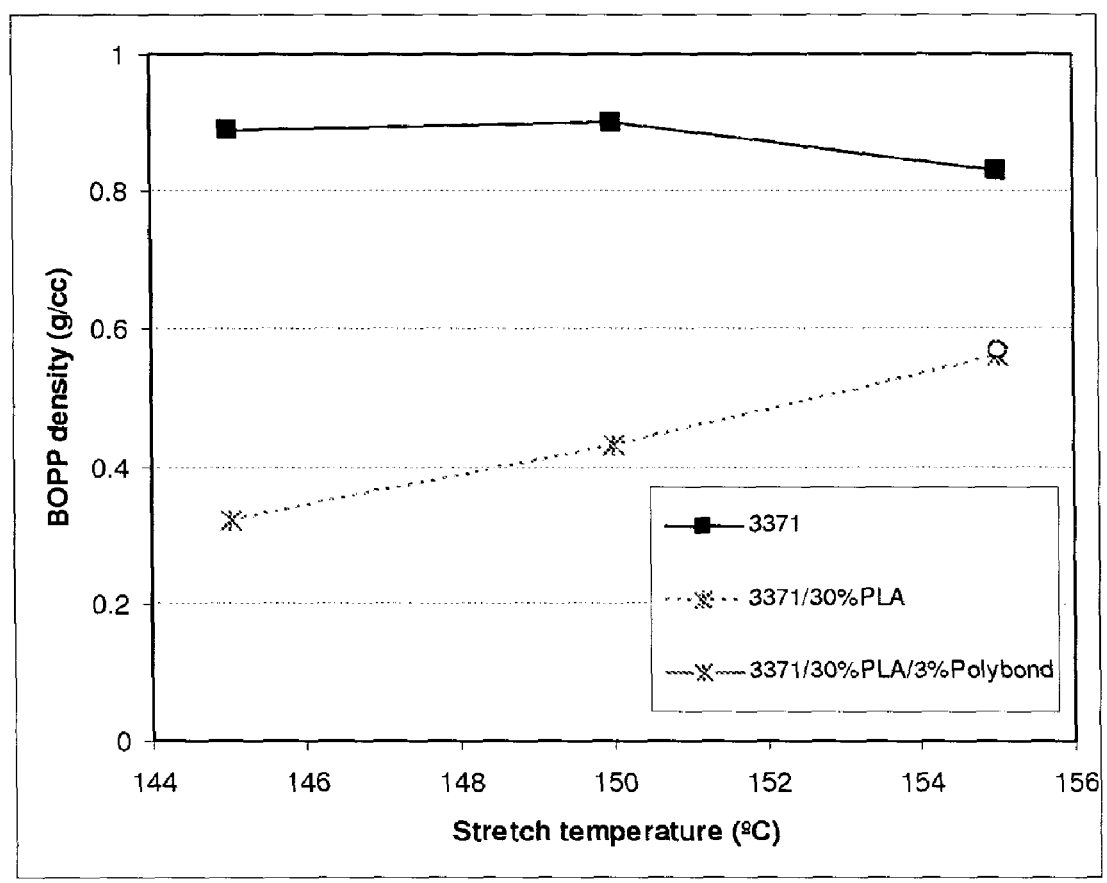
FIG. 12 is a plot of BOPP density as a function of stretch temperature for the samples from Example 10.

Without wishing to be limited by theory, the presence of larger amount of PLA lowered the stretching force, especially in the traverse direction, which was probably due to cavitation during stretching. FIG. 12 is a plot of BOPP density as a function of stretch temperature. Referring to FIG. 12, Sample 18, which was the uncompatibilized sample, was observed to have lower BOPP density when compared to Sample 17 and lower PLA amount (Sample 3) as shown in FIG. 11. Without wishing to be limited by theory, lower stretch temperatures, lower stretch speed, and/or lower draw ratio were more favorable for film cavitation, resulting in lower densities as observed in Sample 18.

Additionally, samples 18 and 19 appeared to be white and opaque with rough surface. Both samples 18 and 90 were further observed under an optical microscope and were found to have large pores.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of producing an oriented film comprising:
blending a polypropylene copolymer and a polylactic acid to form a polymeric blend, wherein the polypropylene copolymer is a propylene heterophasic copolymer comprising a propylene homopolymer phase and a copolymer phase of a random propylene/ethylene copolymer and wherein the propylene/ethylene copolymer phase has an intrinsic viscosity of greater than 2.0 dl/g; and
forming the polymeric blend into a film.

2. The method of claim 1 wherein the film has a 1% secant modulus of from 200 kpsi to 400 kpsi.

3. The method of claim 1 wherein the film has a tensile strength at break of from 20 kpsi to 40 kpsi.

4. The method of claim 1 wherein the film has a tensile elongation at break of from 50% to 150%.

5. The method of claim 1 wherein the film is opaque.

6. The method of claim 1 wherein the film has a density of from 0.5 g/cm$^3$ to 0.95 g/cm$^3$.

7. The method of claim 1 wherein the film has a thickness of 1 mil and an oxygen transmission rate of from 300 cc/100 in$^2$/24 h to 450 cc/100 in$^2$/24 h.

8. The method of claim 1 wherein the film has a thickness of 1 mil and a water vapor transmission rate of from 0.8 g/100 in$^2$/24 h to 2.0/100 in$^2$/24 h.

9. The method of claim 1, wherein the film is biaxially oriented.

10. The method of claim 1 wherein the film has a haze of from about 10% to about 95%.

11. The method of claim 1, wherein the film has a gloss 45° of from about 50 to about 125.

12. The method of claim 1, wherein the film is extruded or cast.

13. The method of claim 1, wherein the step of forming the film further comprises:
orienting the film in the machine direction followed by orienting the film in the transverse direction.

14. The method of claim 13, wherein the film is formed using a stretching force of from 1.0 MPa to 30 MPa.

15. The method of claim 13, wherein the film is oriented in the machine direction at a temperature of from 90° C. to 160° C.

16. The method of claim 13, wherein the film is oriented in the transverse direction at a temperature of from 130° C. to 180° C.

17. The method of claim 1, wherein the step of forming the film further comprises:
stretching the film longitudinally and laterally simultaneously.

18. The method of claim 1, further mixing the blend with a cavitating booster prior to forming the film.

19. The method of claim 18 wherein the cavitating booster comprises a polypropylene functionalized with maleic anhydride; polypropylene grafted maleic anhydride; acrylic acid; alkyl acrylic acid; vinylsulfonic acid; acrylamido-2-methylpropanesulfonic acid; alkyl sulfonic acid; acrylonitrile; acrylate esters; or combinations thereof.

* * * * *